M. V. NEMECEK AND R. STROPPEL.
CAN CAPPING MACHINE.
APPLICATION FILED MAY 25, 1921.
1,435,415.
Patented Nov. 14, 1922.
3 SHEETS—SHEET 1.
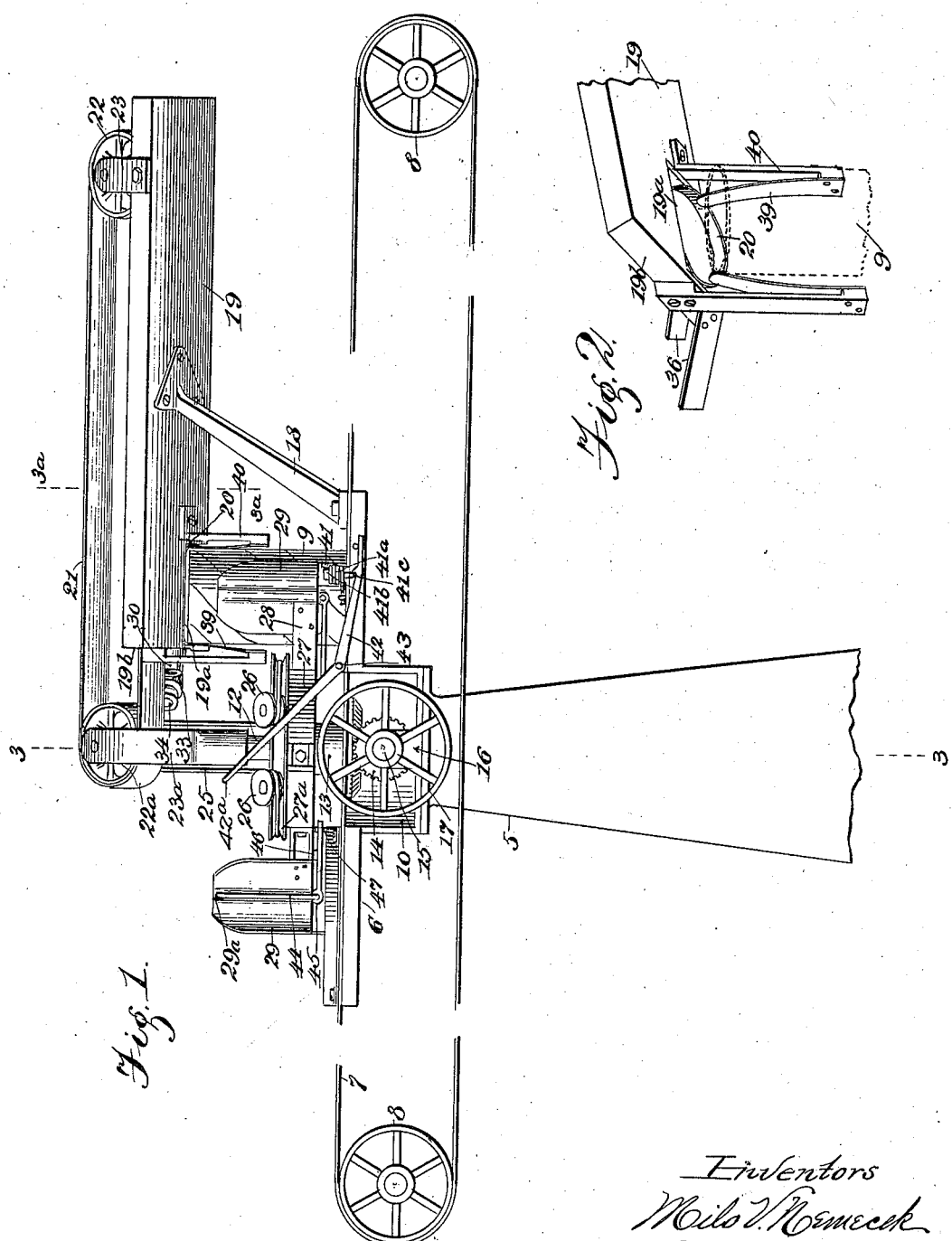
Inventors
Milo V. Nemecek
Rudolf Stroppel
By J. McSt John
Atty.

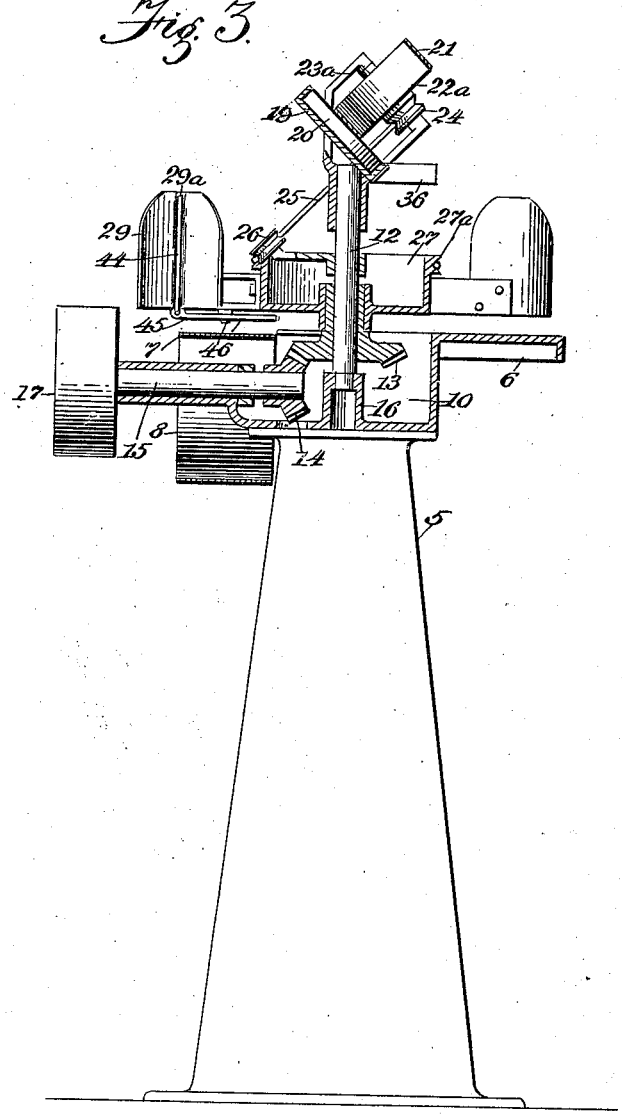

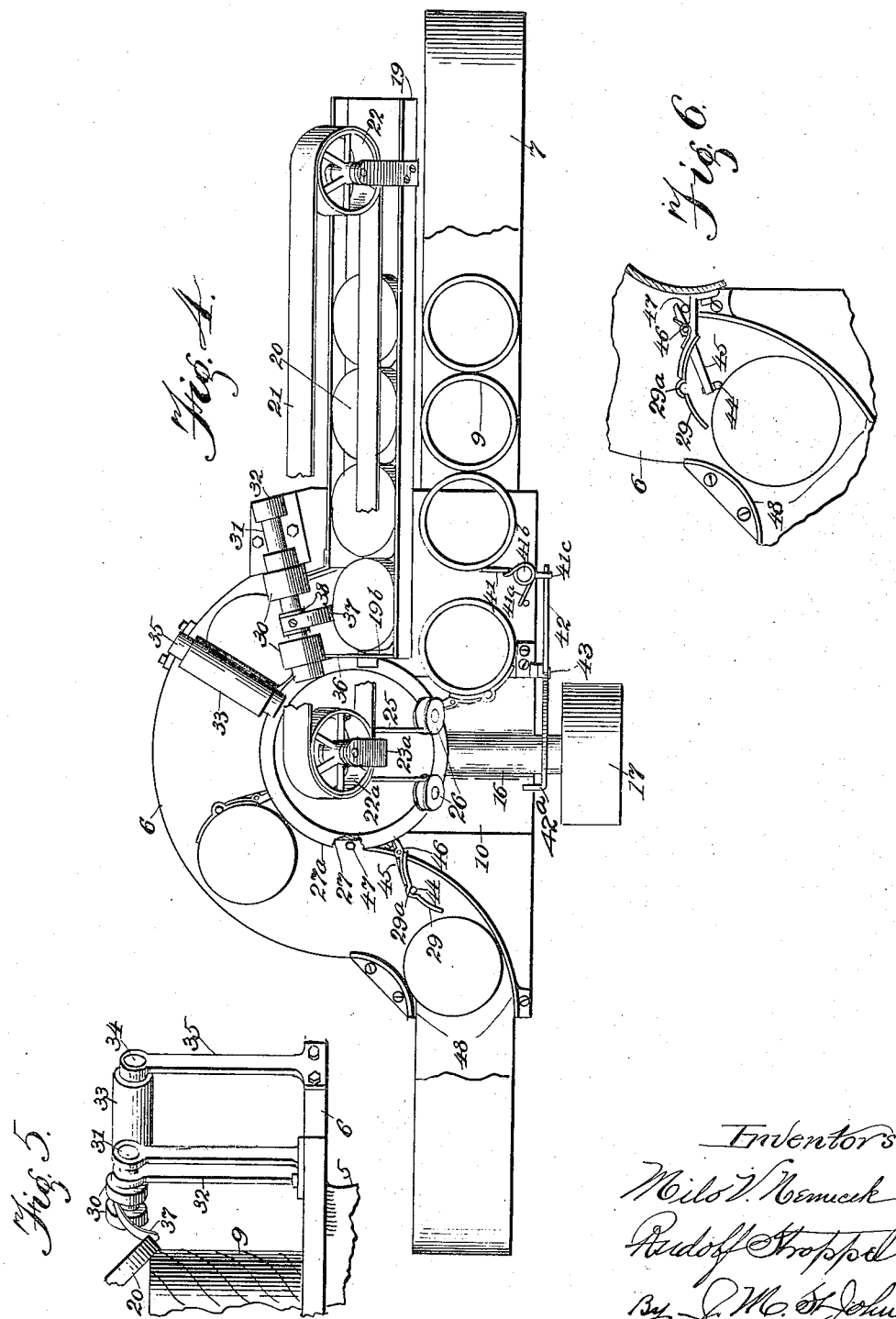

Patented Nov. 14, 1922.

1,435,415

UNITED STATES PATENT OFFICE.

MILO V. NEMECEK AND RUDOLF STROPPEL, OF CEDAR RAPIDS, IOWA.

CAN-CAPPING MACHINE.

Application filed May 25, 1921. Serial No. 472,466.

*To all whom it may concern:*

Be it known that we, MILO V. NEMECEK and RUDOLF STROPPEL, citizens of the United States, residing at Cedar Rapids, in the county of Linn and State of Iowa, have invented certain new and useful Improvements in Can-Capping Machines; and we do hereby declare the following to be a full, clear, and exact description of the invention, such as will enable others skilled in the art to which it appertains to make and use the same.

This invention relates to the capping of cans and like packages for merchandise, and the object of the invention is to produce a simple machine by which this operation is performed neatly and rapidly, and entirely independent of any manual operations.

The invention consists primarily of an arrangement of mechanism whereby the body or shell of the can and the cap, inclined to the end of the shell, are brought together at one side, and by a partial rotation on this point of contact as an axis, the capping operation is completed. The invention thus briefly stated, is fully described and claimed herein, and illustrated in the accompanying drawings, in which:—

Fig. 1 is an elevation of a machine embodying our invention, as seen from the driving pulley side. Fig. 2 is a detail in perspective illustrating the initial stage of the capping operation. Fig. 3 is a section of the same on the line 3—3 of Fig. 1, except the cap chute, sectioned at 3ª—3ª. Fig. 4 is a plan view of the machine complete, but with a part of the main conveyor broken away, the better to show the parts beneath. Fig. 5 is a fragmentary elevation showing the can and cap in the initial capping position, and the capping rollers under which the parts of the package pass. Fig. 6 is a fragmentary plan view, showing a device for accelerating the discharge of the capped package from the sweep to the conveyor.

On a suitable base 5 is mounted an approximately semi-circular platform 6, whose upper surface is nearly level (a little higher, in practice) with the upper surface of a conveyor belt 7 carried by drums 8, and driven by any suitable power at a higher rate of speed than the capping mechanism to be hereafter described. This conveyor brings the shells 9 to a point where they are successively caught by the capping mechanism, and finally carries them away when the capping operation is completed.

The platform has a central pit 10, and from a central hub therein rises a cylindrical post 12 rigidly secured to the hub. Revoluble on this post is a bevel gear 13, which meshes with a pinion 14 on a shaft 15 journaled in a bearing 16 lateral to the pit. The shaft carries a pulley 17 by which the capping machine is driven.

Near one end of the platform is secured a supporting arm 18, and to its upper end is attached a sidewise inclined chute 19 adapted to carry the caps or covers 20, which are here shown as of the familiar cylindrical and flanged type commonly used for paper food packages. It is to be understood, however, that the apparatus is as well adapted for elliptical or rectangular covers as for round ones. This chute is set at such a height that when in position therein the lower angle of the cover-top and its flange is practically level with the upper end of the shell as carried by the conveyor. At the inner end of the chute is a gap 19ª, which allows the shell to pass under the chute, and a segment of its upper end to enter the cover sidewise and engage a portion of its flange, as will be clearly seen by reference to Figs. 1 and 2. The covers are moved inwardly, as respects the machine, by the contact of a belt 21 carried by a pair of pulleys or drums 22 and 22ª. One of these is supported on a bearing 23 attached to the chute, and the other, the driving pulley, is mounted on a bearing 23ª secured to the upper end of the post 12. Attached to this pulley is a sheave 24 carrying a round belt 25, which passes between two idlers 26 and around the grooved portion 27ª of a drum 27 attached to the bevel-gear above described. As will be evident, the covers are fed to capping position considerably faster than they move thereafter, but are arrested at that point by the end of the chute 19ᵇ.

To the sides of the drum 27 are attached a number of arms 28 (4, as herein shown), which carry wings 29 curved to engage neatly a portion of the cylindrical sides of the shells. These wings, or sweeps, as the drum revolves, successively engage the shells, as shown in Fig. 4, sweep them under the inclined covers, and then force them both, the cover being caught by a portion of its flange, under mechanism adapted to complete the capping operation. This preferably simple rollers, and acting successively. A pair of these rollers 30, mounted to turn on a fixed shaft 31 carried by a suitable support 32, rolls the cap to a practically level position on the shell, and a succeeding roller 33, turning on a shaft 34 carried by its support 35, is set a little lower, as shown in Fig. 5, and presses the cover closely down on the shell as they pass under it.

In the capping of tin cans, when the bodies and covers are accurately cylindrical, the foregoing mechanism is probably about all that would be required for the capping operation. In the case of paper packages, however, the parts, especially the cover flanges, are apt to be more or less warped, and so guiding mechanism becomes necessary.

At each side of the outlet gap in the chute is mounted a light spring 36, converging a little, so as to press the sides of the cover into accurate position as they pass between. Directly in front of the cover is another light, flat spring 37 attached to an adjustable collar 38, serving to press the cover snugly against the engaging segment of shell as the parts move against and under it, the spring coiling back under the collar as the parts advance, and then flying back to the initial position. The joint action of these springs serves to make the cover flange hug the shell along the forward half, when the cover will usually close down over the shell without interference. It will sometimes happen, however, that a cover will tend to catch after it is half on the shell, owing to some warp or imperfection. To avoid this difficulty a pair of very light springs 39 are attached at their lower ends to brackets 40 depending from the chute, and set widely enough apart to allow the shell to pass between. These springs curve inwardly at their upper ends, which lie inside the cover flange when in the capping position. When the shell is forced between them they hug the shell at the upper ends, twisting a little to follow its curvature, and following it some little distance to the rear of its center line. During this movement the tips of these thin springs are of course between the cover flange and the shell, and until they finally pass out, by the forward movement of the package, they slide along between the shell and cover, and prevent the edge of the cover flange from catching on the edge of the shell. In practice the last third of the cover flange never causes any trouble.

It is desirable that each shell as it is caught by the sweep be detached from the row of shells on the conveyor, so that its movement by the sweep may be unobstructed. This is effected by the use of a detent 41 provided with a retractile spring 41ª, and pivoted at 41ᵇ. The tail 41ᶜ is engaged by a latch-lever 42 pivoted at 43. When a sweepwing passes under an offset 42ª the inclined upper end of the wing disengages the latch, and the row of shells may then advance, the detent flying back, and the latch reengaging by gravity, as soon as one passes.

In order that the same conveyor may be used for taking away the capped packages as well as for bringing the uncapped shells, an accelerator or deflector is provided to release the package from its holding wing. The wings are accordingly provided with vertical seats 29ª to receive vertical rods 44 attached to levers 45 pivoted at 46. In the movement of the sweep the tails of these levers engage a stud 47 and throw the package forward, as shown in Fig. 6, so that the outer edges of the wings do not catch and drag or crush the packages, which pass out through a short curved chute 48 to the delivery portion of the conveyor.

Having thus described our invention, we claim:

1. In a can-capper, a sweep to move the shells sidewise, a superimposed, sidewise inclined cover-chute with a lateral gap therein to permit the passage of shells, and means in the path of the advanced covers and shells to cap the shells by leveling the initially inclined covers.

2. In a can-capper, a sweep to move a single shell sidewise, a support for one end of the shell, an oppositely disposed, sidewise inclined holder for a single cover, open to permit one side of a shell-end to enter within the cover flange laterally, means adapted to press the cover-flange elastically against the advancing shell, and means for affixing the cover by leveling it on the shell.

3. In a can-capper, a chute to carry covers in a laterally inclined position, and having a lateral gap for a single cover to pass through, springs adjacent to the gap to hold the cover elastically, cover-leveling apparatus in advance thereof, and means for forcing a shell sidewise into the cover and under the cover-leveling apparatus.

4. In a can-capper, an inclined support for a cover, thin, elastic blades whose free ends enter the cap-flange when in capping position, and means for forcing a shell sidewise between said blades, and for leveling the cap on the shell after the blades have emerged from the rear side of the cover flange.

5. In a can-capper, a platform to support shells on end, an adjacent conveyor, a detent for the advancing row of shells, a releasing latch therefor, and a sweep to move shells successively in the capping operation, and adapted to trip the latch, whereby a shell advances to a free position for engagement by the sweep.

6. In a can-capper, a platform to support shells on end, a sweep to move the shells sidewise thereon, a superimposed, inclined cover-chute, a feed-belt to advance the covers therein, carrying pulleys therefor, a driving sheave connecting with one of the pulleys, a sheave forming a part of the sweep, and a belt connecting said sheaves.

7. In a can-capping machine, a platform to support the shells on end, a horizontally revolving sweep to move the shells sidewise, having wings conforming to the shape of the shell, and a shell-ejector to project a shell forward of the wing in discharging the same, the ejector comprising a lever pivoted to the sweep-arm, an attached member normally seated in the wing, a restoring spring, and a stud fixed in the path of the opposite end of the lever.

In testimony whereof we affix our signatures in presence of two witnesses.

MILO V. NEMECEK.
RUDOLF STROPPEL.

Witnesses:
F. W. ARMSTRONG,
D. L. WOOD.